(12) United States Patent
Kim (10) Patent No.: US 7,924,361 B2
(45) Date of Patent: Apr. 12, 2011

(54) PORTABLE DISPLAY DEVICE

(75) Inventor: Jung-Hoon Kim, Suwon-si (KR)

(73) Assignee: Samsung Mobile Display Co., Ltd., Nongseo-Dong, Giheung-Gu, Yongin, Gyunggi-Do (KR)

( * ) Notice: Subject to any disclaimer, the term of this patent is extended or adjusted under 35 U.S.C. 154(b) by 595 days.

(21) Appl. No.: 11/790,217

(22) Filed: Apr. 24, 2007

(65) Prior Publication Data

US 2008/0111936 A1 May 15, 2008

(30) Foreign Application Priority Data

Nov. 9, 2006 (KR) .......................... 10-2006-110569

(51) Int. Cl.
*G02F 1/1333* (2006.01)
(52) U.S. Cl. .......................................................... 349/58
(58) Field of Classification Search .................... 349/56, 349/58
See application file for complete search history.

(56) References Cited

U.S. PATENT DOCUMENTS

| 2002/0050977 | A1 | 5/2002 | Hsieh et al. | |
|---|---|---|---|---|
| 2003/0164903 | A1 | 9/2003 | Saito et al. | |
| 2004/0076006 | A1 * | 4/2004 | Mai | 362/241 |
| 2005/0018416 | A1 * | 1/2005 | Amaya | 362/31 |
| 2005/0248280 | A1 | 11/2005 | Hsieh et al. | |
| 2006/0082271 | A1 | 4/2006 | Lee et al. | |
| 2006/0087601 | A1 * | 4/2006 | Lee | 349/60 |
| 2006/0152650 | A1 * | 7/2006 | Shen et al. | 349/61 |
| 2006/0203479 | A1 | 9/2006 | Lai et al. | |
| 2007/0002590 | A1 * | 1/2007 | Jang et al. | 362/633 |

FOREIGN PATENT DOCUMENTS

| JP | 11-119216 | | 4/1999 |
|---|---|---|---|
| JP | 2000-227594 | | 8/2000 |
| JP | 2002162626 A | * | 6/2002 |
| JP | 2003-215546 | | 7/2003 |
| JP | 2006-128129 | | 5/2006 |
| JP | 2006-253689 | | 9/2006 |
| KR | 10-2004-0103179 | | 12/2004 |
| KR | 10-2005-0073999 | | 7/2005 |
| KR | 10-20060054996 | | 5/2006 |
| KR | 10-20060090387 | | 8/2006 |
| WO | 2004/027315 | | 4/2004 |

OTHER PUBLICATIONS

*Notice of Allowance* from the KIPO issued in Applicant's corresponding Korean Patent Application No. 2006-0110569 dated May 28, 2008.
*Office action* from the Korean Intellectual Property Office issued in Applicant's corresponding Korean Patent Application No. 10-2005-73999 dated Nov. 28, 2007.

(Continued)

*Primary Examiner* — Hemang Sanghavi
(74) *Attorney, Agent, or Firm* — Robert E. Bushnell, Esq.

(57) ABSTRACT

A portable display device capable of preventing the ambient temperature of a light source provided in a liquid crystal display device from being intensively raised. The portable display device is constructed with a liquid crystal display panel; a backlight assembly including light source for supplying light to the liquid crystal display panel, and a mold frame receiving the liquid crystal display panel and the light source as well as surrounding at least two sides of the light source. At least one region of the mold frame surrounding the sides of the light source is formed of at least one aperture.

10 Claims, 4 Drawing Sheets

OTHER PUBLICATIONS

Office Action from SIPO issued in Applicant's corresponding Chinese Patent Application No. 2007101627284 dated Feb. 13, 2009.
Office action from Japanese Patent Office issued in Applicant's corresponding Japanese Patent Application No. 2007-002349 dated Mar. 2, 2010, and Request for Entry of the Accompanying Office Action for Japanese Office action attached herewith.

Search Report from European Patent Office issued in Applicant's corresponding European Patent Application No. 07254419.0 dated Mar. 3, 2010.
European Office Action issued on Dec. 15, 2010 in the corresponding European Patent Application No. 07254419.0.

* cited by examiner

PORTABLE DISPLAY DEVICE

CLAIM OF PRIORITY

This application makes reference to, incorporates the same herein, and claims all benefits accruing under 35 U.S.C. §119 from an application for PORTABLE DISPLAY DEVICE earlier filed in the Korean Intellectual Property Office on 9 Nov. 2006 and there duly assigned Serial No. 10-2006-0110569.

BACKGROUND OF THE INVENTION

1. Field of the Invention

The present invention relates to a portable display device having a liquid crystal display device, and more particularly to a portable display device capable of preventing the ambient temperature of a light source provided in a liquid crystal display device from being concentratedly raised.

2. Description of the Related Art

Recently, various flat panel display (FPD) devices capable of reducing weight and volume, which are disadvantages of a cathode ray tube display device, have been developed. As the flat panel display device, there are a liquid crystal display (LCD), a field emission display (FED), a plasma, display panel (PDP) and a light emitting display (LED), etc.

Here, a liquid crystal display device, which has advantages of a miniature size, light weight and low power, has been spotlighted as a replacement able to overcome the disadvantage of a conventional cathode ray tube, and it has been currently mounted on portable apparatus such as a cellular phone and a portable digital assistor (PDA), as well as small and large products such as a monitor and TV.

A contemporary portable display device is construed with a liquid crystal display panel, a backlight assembly, a bottom chassis, first and second printed circuit boards and a light-emitting display panel.

The liquid crystal display panel which displays a video image is constructed with a first substrate, a second substrate and a liquid crystal injected between the first and second substrates. An integrated circuit is inserted to one side of the second substrate.

The backlight assembly is constructed with light-emitting diodes, a light-emitting diode substrate, a light guide plate, a reflecting plate, optical sheets and a mold frame. The light-emitting diodes function as a light source for the liquid crystal display device and are mounted on the light-emitting diode substrate. The light-emitting diode substrate supplies the driving signals to the light-emitting diodes. At least one circuit component is mounted on the light emitting diode substrate. The light guide plate supplies the light generated from the light-emitting diodes to the liquid crystal display panel. Therefore, the light emitting diodes are disposed immediately adjacent to the light guide plate.

In the mold frame, the liquid crystal display panel, the light-emitting diode substrate constructed with the light-emitting diode which is a light source, the light guide plate, the reflecting plate, and the optical sheets, are received In the contemporary portable display device, the liquid crystal display panel and integrated circuit may malfunction due to the heat generated when the light-emitting diodes emit light.

In particular, the contemporary portable display device is designed that the sides of each light-emitting diode excepting the side adjacent to the light guide plate are surrounded by the mold frame in order to prevent light leakage. In this case, however, the heat generated from the light-emitting diode fails to smoothly circulate so that the ambient temperature of the light-emitting diode continuously remains in a high lever.

In the region adjacent to the light-emitting diode where the liquid crystal display panel and the integrated circuit of the liquid crystal display panel are positioned, the liquid crystal display panel is partly heated so that the liquid crystal injected between the first and second substrates of the liquid display panel and the elements included in the integrated circuit may deteriorate due to the high ambient temperature of the light-emitting diode. In addition, in the case that at least one circuit component is mounted on the light-emitting diode substrate, this circuit component may also deteriorate due to the high temperature.

Therefore, we have discovered that it is necessary to prevent the ambient temperature of the light-emitting diode from being intensively raised by dispersing the heat generated from the light-emitting diode while the diode is acting as a light source for the liquid crystal display panel.

SUMMARY OF THE INVENTION

It is therefore an object of the present invention to provide an improved portable display device.

It is another object to provide a portable display device capable of circulating the ambient air of light source in order to prevent the ambient temperature of light source provided in a liquid crystal display device, such as a light-emitting diode, from being intensively raised.

In order to accomplish the above objects, a portable display device of the present is constructed with a liquid crystal display panel; a backlight assembly including light source for supplying light to the liquid crystal display panel, and a mold frame included in the backlight assembly for receiving the liquid crystal display panel and the light source as well as surrounding at least two sides of the light source. At least one region of the mold frame surrounding the sides of the light source is constructed with at least one aperture.

Preferably, the aperture is formed in a tubular shape to penetrate the mold frame. The cross-section of the aperture is a circle. The backlight assembly may be further constructed with a light guide plate positioned in one side of the light source and supplying the light supplied from the light source to the liquid crystal display panel. The mold frame may be formed to surround all the sides of the light source excepting the side adjacent to the light guide plate. The light source may be a light-emitting diode.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which preferred embodiments of the invention are shown.

Figure 1:
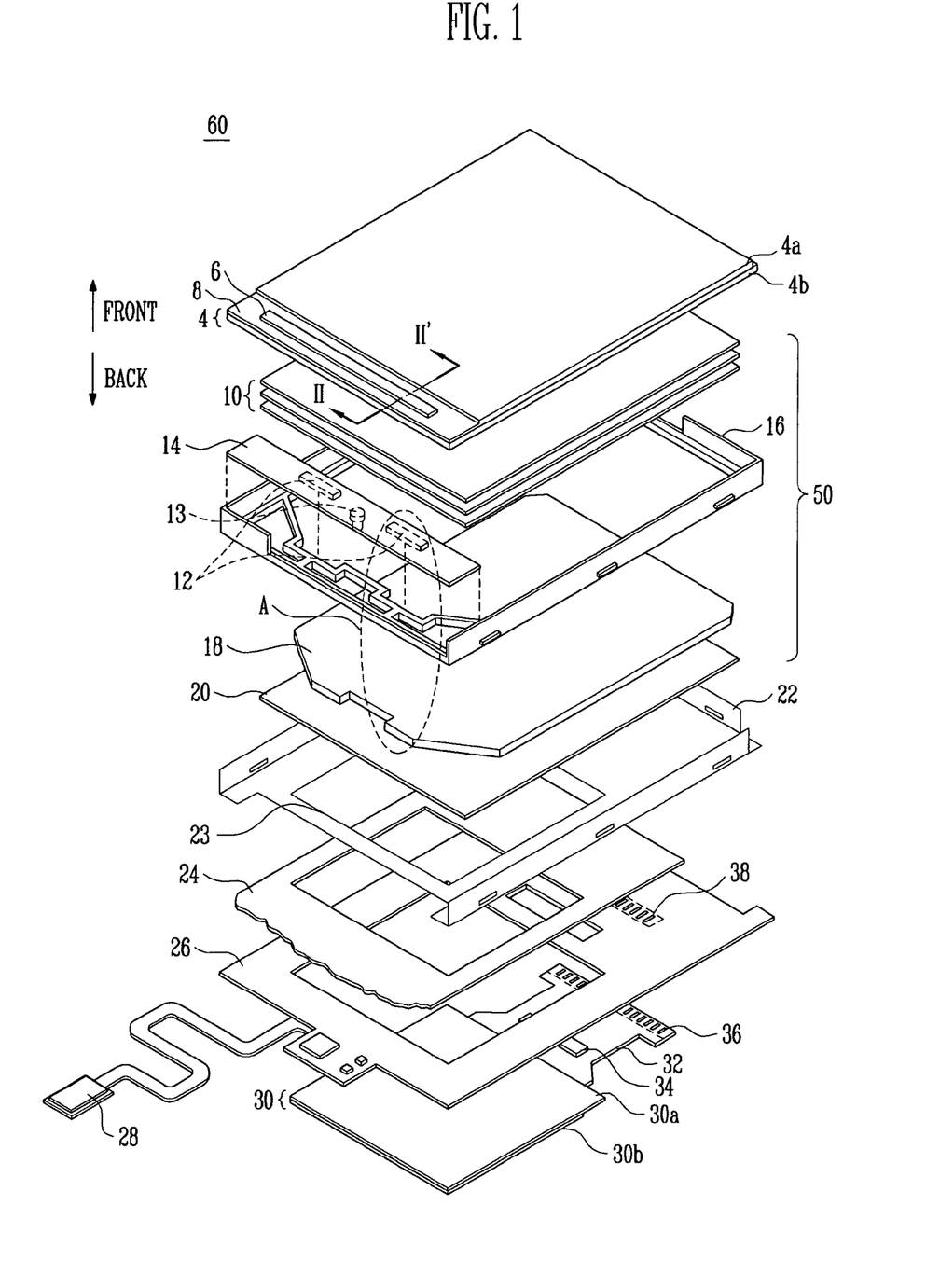
FIG. 1 is an exploded perspective view showing a contemporary portable display device.
Figure 2:
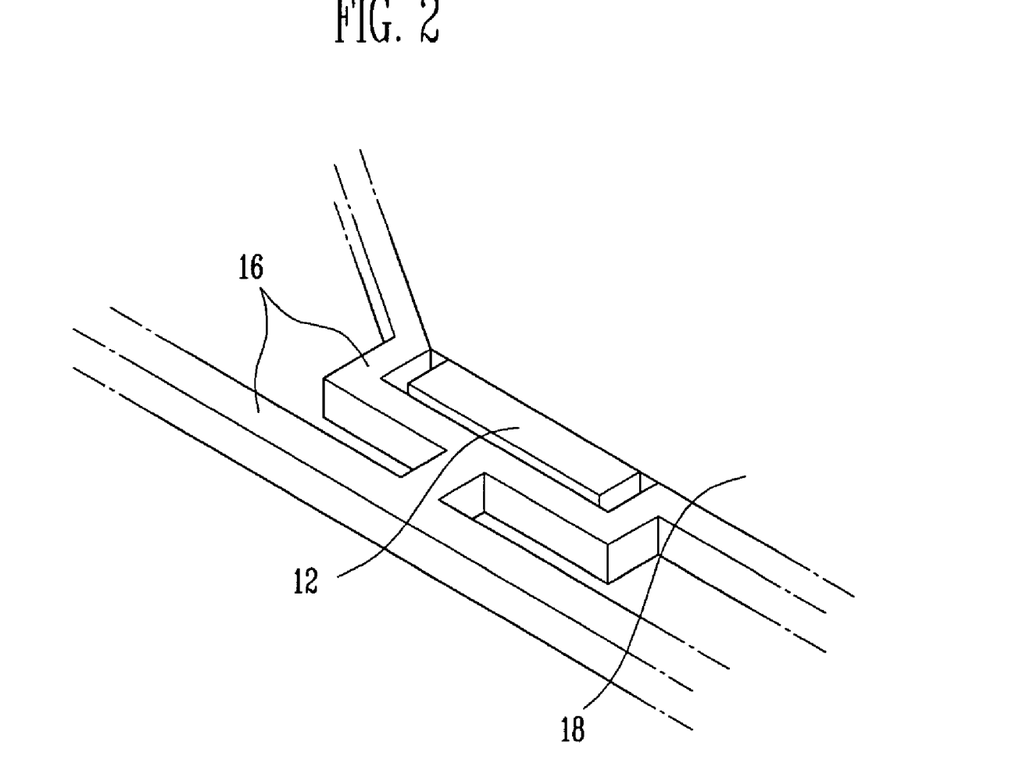
FIG. 2 is a coupled perspective view of part A illustrated in FIG. 1.
Figure 3:
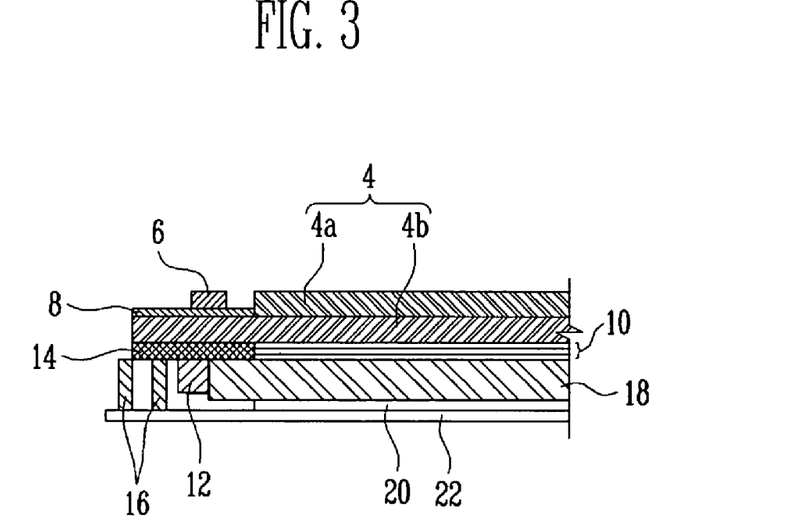
FIG. 3 is a coupled cross-sectional view of a liquid crystal display panel, a backlight assembly, and a bottom chassis receiving them taken along line II-II' illustrated in FIG. 1.

FIG. 1 is an exploded perspective view showing a contemporary portable display device. In FIG. 1, a dual display device used in a cellular phone, etc., is constructed with at least one liquid crystal display device. FIG. 2 is a coupled perspective view of part A illustrated in FIG. 1, and FIG. 3 is a coupled cross-sectional view of a bottom chassis receiving a liquid crystal display panel and a backlight assembly taken along line II-II' in FIG. 1. For convenience, a light-emitting diode substrate is not shown in FIG. 2.

Referring to FIGS. 1 and 2, a contemporary portable display device 60 is construed with a liquid crystal display panel 4, a backlight assembly 50, a bottom chassis 22, first and second printed circuit boards 24 and 26, and a light-emitting display panel 30.

Liquid crystal display panel 4 which is a first display panel, displays a video image. To this end, liquid crystal display panel 4 is constructed with a first substrate 4a, a second substrate 4b and a liquid crystal (not shown) injected between first and second substrate 4a and 4b.

Second substrate 4b is constructed with a plurality of thin film transistors (hereinafter, referred to as "TFT", which are not shown) disposed in a matrix shape. Here, source electrodes (not shown) of the TFTs are connected to a data line (not shown), and gate electrodes (not shown) of the TFTs are connected to a scan line (not shown). And, drain electrodes (not shown) of the TFTs are connected to a pixel electrode (not shown) made from an electrically conductive material, such as transparent indium tin oxide (ITO). When scan signals are supplied to the scan line, the TFT is turned on and supplies the data signals from the data line to the pixel electrode.

To this end, an integrated circuit 6 is inserted onto one side of second substrate 4b. The data signals and the scan signals are supplied from integrated circuit 6. A protective layer 8 is disposed on second substrate 4b, surrounding integrated circuit 6.

First substrate 4a is disposed to be opposite to second substrate 4b. A common electrode made from ITO is applied to the front side of first substrate 4a. A certain voltage is applied to the common electrode, and accordingly, a certain electric field is formed between the common electrode and the pixel electrode. The array angle of the liquid crystal injected between first substrate 4a and second substrate 4b is changed by the electric field, and a light transmittance is changed due to the changes in the array angle, thereby a desired image can be displayed.

Meanwhile, although not shown, the upper and lower sides of the liquid crystal display panel 4 are further provided with upper and lower polarizing plates, respectively.

Backlight assembly 50 is constructed with light-emitting diodes 12, a light-emitting diode substrate 14, a light guide plate 18, a reflecting plate 20, optical sheets 10 and a mold frame 16.

Light-emitting diodes 12 are mounted on light-emitting diode substrate 14 in a chip shape and generate light with a certain brightness corresponding to the driving signals supplied from light-emitting diode substrate 14. In other words, light-emitting diodes 12 function as a light source for the liquid crystal display device including liquid crystal display panel 4 and backlight assembly 50.

Light-emitting diode substrate 14, which is connected to first printed circuit board 24, supplies the driving signals to light-emitting diodes 12 corresponding to the control signals supplied from first printed circuit board 24. At least one circuit component, for example, a circuit component 13 supplying the driving signals to light-emitting diodes 12, is mounted on light emitting diode substrate 14.

Light guide plate 18 supplies light generated from light-emitting diodes 12 to liquid crystal display panel 4. In other words, light guide plate 18 supplies light to liquid crystal display panel 4 positioned at the upper side of light guide plate 18, while the light is supplied from the side of light guide plate 18. Here, in order to prevent light leakage and occurrence of hot-spot, the thickness of light guide plate 18 is set to be larger than or identical to the side thickness of light-emitting diode 12. Accordingly, the thickness of light guide plate 18 is set to be generally larger than that of the constituent included in backlight assembly 50, such as optical sheets 10.

Reflecting plate 20, which is positioned at the rear side of light guide plate 18, re-supplies the light is incident from light guide plate 18, to light guide plate 18. In other words, reflecting plate 20 improves light efficiency by re-supplying the light incident from light guide plate 18, to light guide plate 18.

Optical sheets 10 improve the brightness of the light supplied from light guide plate 18, and supply the light to liquid crystal display panel 4.

Light-emitting diode substrate 14 mounting light-emitting diode 12 is received and fixed in mold frame 16, where liquid crystal display panel 4 and backlight assembly 50 are fixed and supported.

Bottom chassis 22 is fixed at the lower side of mold frame 16. At this time, an aperture 23 is formed in a part of bottom chassis 22 so that light-emitting display panel 30, which is the second display panel, can be inserted.

Second printed circuit board 26 receives the driving signals from the driving circuit of the cellular phone, which is not shown. To this end, second printed circuit board 26 is constructed with a cellular phone connector 28. Cellular phone connector 28 is united and fixed to another connector adhered to the driving circuit of the cellular phone to receive the driving signals from the driving circuit of the cellular phone. Second printed circuit board 26 receiving the driving signals generates various control signals corresponding to the driving signals supplied to second printed circuit board 26.

First printed circuit board 24 is connected to second printed circuit board 26 through a first pad unit 38. First printed circuit board 24 is connected to integrated circuit 6 inserted onto the front side of liquid crystal display panel 4 by a flexible printed circuit board, which is not shown. First printed circuit board 24 connected to integrated circuit 6 and light-emitting diode substrate 14 drives integrated circuit 6 and light-emitting diode substrate 14 with the control signals supplied from second printed circuit board 26.

Light-emitting display panel 30, which is a second display panel, is constructed with a first substrate 30a and a second substrate 30b. Organic light-emitting diodes (not shown) are disposed on first substrate 30a in a matrix shape. The organic light-emitting diodes generate light of a certain brightness corresponding to the current supplied to the organic light-emitting diodes. Light-emitting display panel 30 is connected to second printed circuit board 26 by means of a second pad unit 36 of flexible printed circuit board 32. Here, integrated circuit 34 is inserted in flexible printed circuit board 32, and integrated circuit 34 allows a video image to be displayed on light-emitting display panel 30 by supplying the control signals from second printed circuit board 26.

In contemporary portable display device 60, liquid crystal display panel 4 and integrated circuit 6 may malfunction due to the heat generated when light-emitting diode 12 serves as a light source of the liquid crystal display device, and concomitantly emits light as well as attendant heat.

In particular, as shown in FIG. 2, contemporary portable display device 60 is designed so that the sides of light-emitting diode 12 excepting the side adjacent to light guide plate 18 are surrounded by mold frame 16 in order to prevent light leakage.

In this case, however, the heat generated from light-emitting diode 12 fails to smoothly circulate so that the ambient temperature of light-emitting diode 12 maintains a high level.

As shown in FIG. 3, in the region adjacent to light-emitting diode 12 where liquid crystal display panel 4 and integrated circuit 6 of liquid crystal display panel 4 are positioned, liquid crystal display panel 4 is partly heated so that the liquid crystal injected between first and second substrates 4a and 4b of liquid display panel 4 and the elements included in integrated circuit 6 may deteriorate due to the high ambient temperature of light-emitting diode 12. Also, although not shown in FIG. 3, in the case that at least one circuit component 13 is mounted on light-emitting diode substrate 14 as shown in FIG. 1, this circuit component 13 may also deteriorate due to the high temperature.

Therefore, it is necessary to prevent the ambient temperature of light-emitting diode 12 from being intensively raised by dispersing the heat generated from light-emitting diode 12 acting as a light source of the liquid crystal display panel.

Hereinafter, preferable embodiments constructed according to the principles of the present invention, which can be easily carried out by those skilled in the art, will be described with reference to the accompanying FIG. 4 to FIG. 7.

Figure 4:
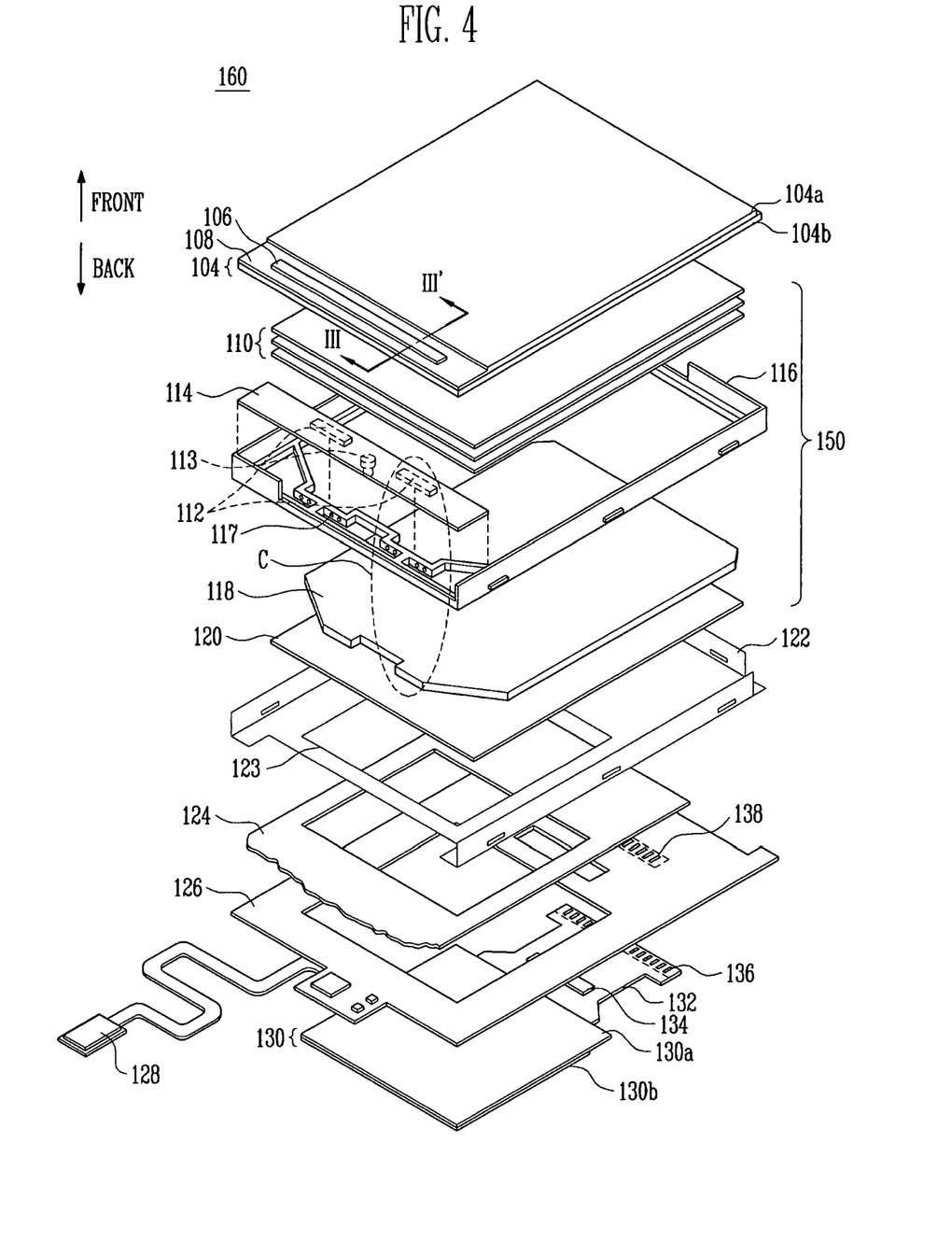
FIG. 4 is an exploded perspective view showing a portable display device according to an embodiment of the principles of the present invention.
Figure 5:
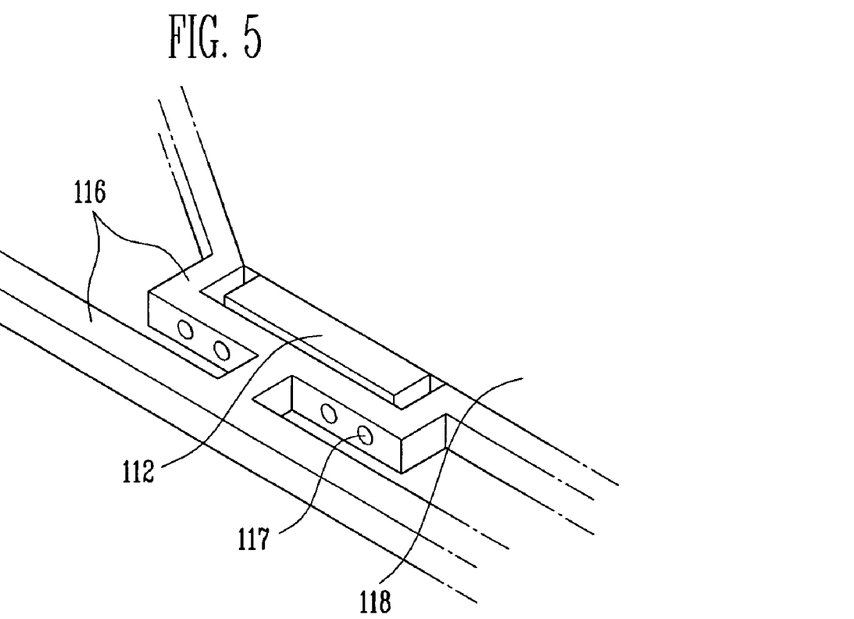
FIG. 5 is a coupled perspective view of part C illustrated in FIG. 4.

FIG. 4 is an exploded perspective view showing a portable display device constructed as an embodiment of the principles of the present invention. Although FIG. 4 shows a dual display device used in a cellular phone and is constructed with at least one liquid crystal display device; the present invention is not limited thereto. And, FIG. 5 is a coupled perspective view of part C illustrated in FIG. 4. For convenience, a light-emitting diode substrate is not shown in FIG. 5.

Referring to FIGS. 4 and 5, a portable display device 160 according to an embodiment of the present invention is constructed with a liquid crystal display panel 104, a backlight assembly 150, a bottom chassis 122, first and second printed circuit boards 124 and 126, and a light-emitting display panel 30.

Liquid crystal display panel 104, which is a first display panel, displays a certain video image. To this end, liquid crystal display panel 104 is constructed with a first substrate 104a, a second substrate 104b and a liquid crystal (not shown) injected between first and second substrates 104a and 104b.

Second substrate 104b is constructed with a plurality of thin film transistors (hereinafter, referred to as "TFT", which is not shown) disposed in a matrix shape. Here, source electrodes (not shown) of the TFTs are connected to a data line (not shown), and gate electrodes (not shown) of the TFTs are connected to a scan line (not shown). And, drain electrodes (not shown) of the TFTs are connected to pixel electrodes (not shown) made from an electrically conductive material, such as transparent indium tin oxide (ITO). When scan signals are supplied to the scan line, the TFT is turned on and supplies the data signals from the data line, to the pixel electrode.

To this end, an integrated circuit 106 is inserted into one side of second substrate 104b. The data signals and the scan signals are supplied from integrated circuit 106. A protective layer 108 is applied to the surroundings of integrated circuit 106.

First substrate 104a is disposed to be opposite to second substrate 104b. A common electrode (not shown) made from ITO is disposed at the front side of first substrate 104a. A certain voltage is applied to the common electrode and accordingly, a certain electric field is formed between the common electrode and the pixel electrode. The array angle of the liquid crystal injected between first substrate 104a and second substrate 104b is changed by the electric field, and the light transmittance is changed due to the changes in the array angle, therefore a desired image can be displayed.

Meanwhile, although not shown, the upper and the lower sides of liquid crystal display panel 104 are further provided with upper and lower polarizing plates, respectively.

Backlight assembly 150 is constructed with a light source for supplying light to liquid crystal display panel 104. More specifically, backlight assembly 150 is constructed with light-emitting diodes 112, a light-emitting diode substrate 114, a light guide plate 118, a reflecting plate 120, optical sheets 110 and a mold frame 116.

Light-emitting diodes 112 are mounted on light-emitting diode substrate 114 in a chip shape and generate light with a certain brightness corresponding to the driving signals supplied from light-emitting diode substrate 114. In other words, light-emitting diodes 112 function as a light source for the liquid crystal display device including liquid crystal display panel 104 and backlight assembly 150.

Light-emitting diode substrate 114 is connected to first printed circuit board 124 and supplies the driving signals to light-emitting diodes 112 by supplying the control signals supplied from first printed circuit board 124. At least one circuit component, for example, a circuit component 113 supplying the driving signals to light-emitting diodes 112 maybe further mounted on light-emitting diode substrate 114.

Light guide plate 118 positioned on one side of light-emitting diodes 112 supplies light generated by light-emitting diodes 112 to liquid crystal display panel 104. In other words, light guide plate 118 supplies light to liquid crystal display panel 104 positioned at the upper side of light guide plate 118, and the light is supplied from the side of light guide plate 118. Here, in order to prevent light leakage and occurrence of hot-spot, the thickness of light guide plate 118 is set to be larger than or identical to the thickness of light-emitting diode 112. Accordingly, the thickness of light guide plate 118 is set to be generally larger than that of the constituent included in backlight assembly 150, such as optical sheets 110.

Reflecting plate 120, which is positioned in the rear side of light guide plate 118, re-supplies the light which is incident from light guide plate 118, to light guide plate 118. In other words, reflecting plate 120 improves light efficiency by re-supplying the light which is incident from light guide plate 118, to light guide plate 118.

Optical sheets 110 improve brightness of the light supplied from light guide plate 118 and supply the light to liquid crystal display panel 104.

Mold frame 116 receives liquid crystal display panel 104 and backlight assembly 150. More specifically, in mold frame 116, liquid crystal display panel 104, light-emitting diode substrate 114 constructed with light-emitting diode 114, which is a light source, light guide plate 118, reflecting plate 120 and optical sheets 110, etc. are received.

Bottom chassis 122 is fixed at the lower side of mold frame 116 and receives liquid crystal display panel 104 and backlight assembly 150. At this time, an aperture 123 is formed in a part of bottom chassis 122 so that light-emitting display panel 130, which is the second display panel, can be inserted.

Second printed circuit board 126 receives the driving signals from the driving circuit of the cellular phone, which is not shown. To this end, second printed circuit board 126 is constructed with a cellular phone connector 128. Cellular phone connector 128 is united and fixed to another connector adhered to the driving circuit of the cellular phone and receives the driving signals from the driving circuit of the cellular phone. Second printed circuit board 126 receiving the driving signals generates various control signals corresponding to the driving signals supplied from second printed circuit board 126.

First printed circuit board 124 is connected to second printed circuit board 126 through a first pad unit 138 formed on second printed circuit board 126. First printed circuit board 124 is connected to integrated circuit 106 of liquid crystal display panel 104 and light-emitting diode substrate 114 by a flexible printed circuit board, which is not shown. First printed circuit board 124 connected to integrated circuit 106 and light-emitting diode substrate 114 drives integrated circuit 106 and light-emitting diode substrate 114 with the control signals supplied from second printed circuit board 126.

Light-emitting display panel 130, which is a second display panel, is constructed with a first substrate 130a and a second substrate 130b. Organic light-emitting diodes (not shown) in a matrix shape are disposed on first substrate 130a. The organic light-emitting diodes generate light at a certain brightness corresponding to the current supplied to the organic light-emitting diodes. Light-emitting display panel 130 is connected to second printed circuit board 126 by a second pad unit 136 of flexible printed circuit board 132. Here, integrated circuit 134 is mounted on flexible printed circuit board 132, and integrated circuit 134 allows light-emitting display panel 130 to display a image with the control signals from second printed circuit board 126.

As shown in FIG. 5, portable display device 160 according to an embodiment of the present invention is designed that at least two sides of light-emitting diode 112, more preferably, all sides of light-emitting diode 112 excepting the side adjacent to light guide plate 118 are surrounded by mold frame 116 in order to prevent light leakage.

In the present invention, however, at least one region of mold frame 116 surrounding the sides of light-emitting diode 112 is constructed with at least one aperture 117 formed by through holes that completely perforate mold frame 116. For example, at least one region of mold frame 116 surrounding the sides of light-emitting diode 112 may be constructed with four apertures 117. Aperture 117 may be formed during molding of mold frame 116.

An aperture 117, which is to prevent the ambient temperature of light-emitting diode 112 from being intensively raised by dispersing the heat, more specifically, by circulating the heated air generated when light-emitting diode 112 emits the light, is formed in a tubular shape to penetrate mold frame 116. For example, aperture 117 may be formed in a tubular shape with a circular cross-section.

Meanwhile, although the cross-section of aperture 117 is a circle in FIGS. 4 and 5, aperture 117 may be formed in various shapes. In other words, the invention is not limited to circular cross-section. For example, the cross-section of aperture 117 may be formed in a square shape. For convenience, it is assumed that the cross-section of aperture 117 is a circle, hereinafter.

Figure 6:
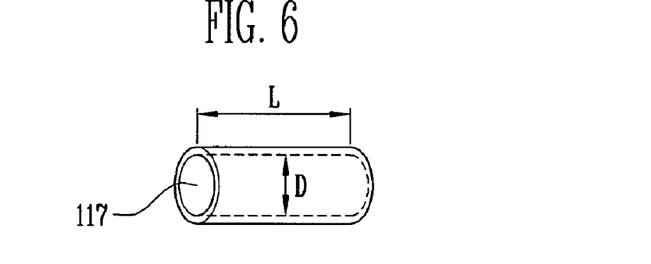
FIG. 6 is a view showing one example of the shape of an aperture formed in a mold frame surrounding a light-emitting diode.

FIG. 6 is a view showing one example of the shape of an aperture formed in a mold frame surrounding a light-emitting diode. Combining FIG. 5 and FIG. 6, the principle for hear dissipation by circulating air will be described below.

Referring to FIG. 6, aperture 117 formed in at least one region of mold frame 116 surrounding light-emitting diode 112 is formed in a tubular shape having a circular cross-section. The heat generated by light-emitting diode 112 is dispersed through aperture 117.

More specifically, if the ambient air of light-emitting diode 112 is heated by the heat generated when light-emitting diode 112 emits the light, the density of the heated air lowers and causes natural convection.

Heat transfer rate Q1 by means of such natural convection is defined depending on the following mathematical equation.

$$Q1 = hA_s(T_s - T_\infty)$$ [Mathematical Equation 1]

Here, $T_s$ represents the surface temperature of light-emitting diode 112 in this embodiment. $T_\infty$ is the temperature of fluid, which is sufficiently apart from the surface of light-emitting diode 112. In this embodiment, $T_\infty$ represents the temperature of the air in the space which is external to the space between light-emitting diode 112 and mold frame 116 surrounding light-emitting diode 112. In other words, $T_\infty$ represents the temperature of the air in the space which is at the side of aperture 117 opposite to the side where the space between light-emitting diode 112 and mold frame 116 surrounding light-emitting diode 112 is located.

Also, $A_s$ represents a surface area of aperture 117, that is, a surface area of the inner tube of aperture 117 formed in a tubular shape. Surface area $A_s$ of aperture 117 is defined depending on the following mathematical equation 2, where the diameter of the circular cross-section of aperture 117 is D and the length of aperture 117 is L.

$$A_s = \pi DL$$ [Mathematical Equation 2]

In addition, h in equation 1 represents a convection heat transfer coefficient, and may be calculated depending on mathematical equation 3.

$$h = \frac{k}{D}Nu$$ [Mathematical Equation 3]

Here, Nu is the Nusselt number. According to mathematical equation 3, convection heat transfer coefficient h is inversely proportional to circular cross-section diameter D and is proportional to Nusselt number Nu. Here, Nusselt number Nu is defined as a dimensionless number characterizing the relationship between temperature field and heat transfer intensity on a boundary layer of flow, and is a dimensionless number representing the rate of heat exchange between fluid (that is, the air) and solid (that is, a tube wall of the aperture).

Nusselt number Nu of such natural convection may be calculated on the basis of the following mathematical equation 4.

$$Nu = \left[0.6 + \frac{0.387 Ra_D^{1/6}}{[1 + (0.559/Pr)^{9/16}]^{4/9}}\right]^2$$ [Mathematical Equation 4]

In mathematical equation 4, Pr represents the Prandtl number which is a ratio of momentum diffusivity and the thermal diffusivity. Prandtl number Pr is a criterion for a relative validity of momentum and energy transfer by means of diffusion in a velocity boundary layer and a motion boundary layer.

And, $Ra_D$ represents the Rayleigh number that is a dimensionless number which is introduced by J. Rayleigh in order to determine whether heat convection occurs or not in a fluid layer. Rayleigh number $Ra_D$ may be obtained on the basis of the following mathematical equation 5.

$$Ra_D = \left[\frac{g\beta(T_S - T_\infty)D^3}{v^2}\right]Pr \quad \text{[Mathematical Equation 5]}$$

In mathematical equation 5, g represents acceleration of gravity and β represents volumetric expansion coefficients. β is the same with 1/T in ideal gas. Also, v represents kinematic viscosity of fluid (that is, for example, air).

The variables excepting L and D in mathematical equations 1 to 5 have substantially constant value in a certain state.

Therefore, when the shape of aperture 117, for example, the shape of the cross-section of aperture 117 is a circle, the convective heat transfer rate Q1 may be controlled by diameter D of the circular cross-section, length L of aperture 117, and the number of aperture 117.

Thereby, the present invention can control the desired convective heat transfer rate Q1 in a certain condition by means of the shape, the size and the number of aperture 117.

Meanwhile, in addition to the heat transfer due to convection, the heat transfer due to radiation occurs at the same time. The heat transfer rate due to radiation is also proportional to surface area $A_s$ of aperture 117 so that it can be controlled by means of the shape, the size and the number of aperture 117.

As described above, the present invention can prevent the ambient temperature of light-emitting diode 112 from being intensively raised by forming at least one aperture 117 in mold frame 116 in order to obtain the desired convective heat transfer rate Q1 and radiative heat transfer rate.

In other words, the present invention includes at least one aperture 117 formed on the mold frame surrounding light-emitting diode 112 so that it can prevent deterioration of elements positioned adjacent to light-emitting diode 112 by dispersing heat generated from light-emitting diode 112.

Figure 7:
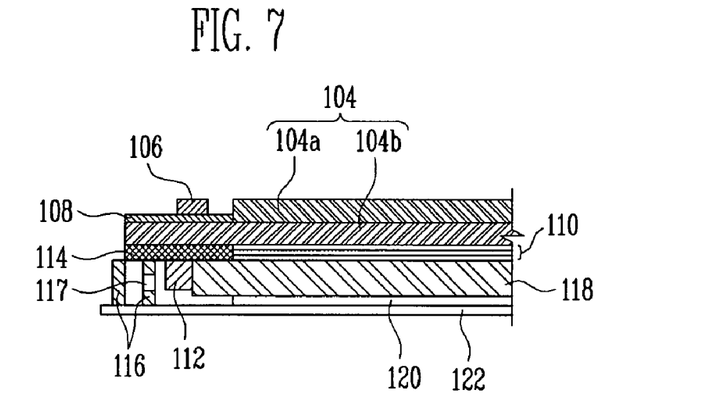
FIG. 7 is a coupled cross-sectional view of a liquid crystal display panel, a backlight assembly, and a bottom chassis receiving them taken along line III-III' illustrated in FIG. 4.

More specifically, as shown in FIG. 7, since liquid crystal display panel 104 and integrated circuit 106 of liquid crystal display panel 104 are positioned in the region adjacent to light-emitting diode 112, the present invention can prevent the ambient temperature of light-emitting diode 112 from being intensively raised by dissipating the heat generated by light-emitting diode 112. Thereby, the present invention partly heats liquid crystal display panel 104 so that it can prevent deterioration of liquid crystal display panel 104, in particular, liquid crystal injected therebetween, and elements included in integrated circuit 106. Also, although not shown in FIG. 7, when at least one circuit component 113 illustrated in FIG. 4 is mounted on light-emitting diode substrate 114, such a circuit component 113 is also protected from deterioration due to a high temperature.

Meanwhile, although it is assumed that the cross-sectional shape of aperture 117 is a circle in the exemplary embodiment of the present invention, the present invention is not limited thereto. Although the cross-section of aperture 117 is not limited to a circle, the surface area of the inner tube of aperture 117 can be calculated so that various shapes of aperture 117 can be formed on the mold frame in order to obtain the desired convective heat transfer rate Q1 and radiative heat transfer heat. Thereby, it is possible to prevent the ambient temperature of light-emitting diode 112 from being intensively raised.

As described above, the portable display device according to the present invention can disperse heat by circulating air heated by means of heat generated when the light source emits the light, by forming at least one aperture in the mold frame surrounding the sides of the light source in the portable display device with the liquid crystal display device.

Embodiments of the present invention, by enabling the circulating air to pass through the apertures formed by opening portion 117, thereby prevent the ambient temperature of the light source from being concentrated, and thus raised. Accordingly, the present invention can prevent deterioration of elements positioned adjacent to the light source, for example, the liquid crystal display panel and the integrated circuit thereof, and the circuit components included in the substrate mounting the light source.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A portable display device, comprising:
   a liquid crystal display panel;
   a backlight assembly comprising a light source for supplying light to the liquid crystal display panel; and
   a mold frame included in the backlight assembly and retentively receiving the liquid crystal display panel and the light source as well as surrounding at least two sides of the light source, with at least one region of the mold frame surrounding the sides of the light source perforated by at least one aperture , and air in a first space formed between the light source and the mold frame being convectively connected via said aperture to ambient air in a second space which is external to the first space.

2. The portable display device as claimed in claim 1, with the aperture being formed in a tubular shape penetrating the mold frame.

3. The portable display device as claimed in claim 2, with the cross-section of the aperture is a circle.

4. The portable display device as claimed in claim 1, with the backlight assembly further comprising a light guide plate positioned in one side of the light source and supplying the light generated from the light source to the liquid crystal display panel.

5. The portable display device as claimed in claim 4, with the mold frame being formed to surround all of the sides of the light source except the side adjacent to the light guide plate.

6. The portable display device as claimed in claim 1, with the light source being a light-emitting diode.

7. A method for dissipating heat generated by a portable display device comprising a liquid crystal display panel, a backlight assembly comprising a light source for supplying light to the liquid crystal display panel, a mold frame receiving the liquid crystal display panel and the light source and surrounding at least two sides of the light source, the method comprising:
   forming at least one aperture in at least one region of the mold frame surrounding the sides of the light source in such a way that the air between the light source and the mold frame can be transferred to a space which is external with respect to the space between the light source and the mold frame; and controlling the cross-sectional area and the length of the aperture to control a rate of heat transfer of the air between the light source and the mold frame and the air in the space which is external with respect to the space between the light source and the mold frame.

8. The portable display device as claimed in claim 7, with the aperture being formed in a tubular shape penetrating the mold frame.

9. The portable display device as claimed in claim 8, with the cross-section of the aperture is a circle.

10. The portable display device as claimed in claim 7, with the light source being a light-emitting diode.

* * * * *